(12) United States Patent
Kai

(10) Patent No.: US 10,547,775 B2
(45) Date of Patent: Jan. 28, 2020

(54) IMAGE PICKUP APPARATUS HAVING A FUNCTION FOR ADJUSTING A DETECTED IN-FOCUS POSITION AND CONTROL METHOD FOR IMAGE PICKUP APPARATUS

(71) Applicant: CANON KABUSHIKI KAISHA, Tokyo (JP)

(72) Inventor: Hirohito Kai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/000,276

(22) Filed: Jun. 5, 2018

(65) Prior Publication Data
US 2019/0007598 A1 Jan. 3, 2019

(30) Foreign Application Priority Data
Jun. 28, 2017 (JP) .................. 2017-126236

(51) Int. Cl.
*H04N 5/232* (2006.01)
*H04N 5/369* (2011.01)

(52) U.S. Cl.
CPC ..... *H04N 5/23212* (2013.01); *H04N 5/23293* (2013.01); *H04N 5/3696* (2013.01)

(58) Field of Classification Search
None
See application file for complete search history.

(56) References Cited

U.S. PATENT DOCUMENTS

| | | | | |
|---|---|---|---|---|
| 2015/0116578 | A1* | 4/2015 | Hamada | H04N 5/23209 348/349 |
| 2016/0150149 | A1* | 5/2016 | Abe | H04N 5/23212 |
| 2016/0150150 | A1* | 5/2016 | Abe | H04N 5/23212 348/350 |
| 2016/0150166 | A1* | 5/2016 | Hashimoto | H04N 5/23212 348/241 |
| 2017/0180629 | A1* | 6/2017 | Abe | G02B 3/0006 |
| 2017/0359501 | A1* | 12/2017 | Abe | H04N 5/232122 |
| 2018/0063414 | A1* | 3/2018 | Hongu | G02B 7/09 |
| 2018/0278829 | A1* | 9/2018 | Fukai | H04N 5/23212 |
| 2018/0316846 | A1* | 11/2018 | Kuroda | H04N 5/23212 |
| 2019/0014267 | A1* | 1/2019 | Kunieda | H04N 5/232127 |

FOREIGN PATENT DOCUMENTS

JP 2011-232704 A 11/2011

\* cited by examiner

*Primary Examiner* — Cynthia Segura
(74) *Attorney, Agent, or Firm* — Canon U.S.A., INC. IP Division

(57) ABSTRACT

An apparatus includes a sensor outputting a first signal having a parallax, an image sensor outputting a second signal having a parallax, at least one processor, and a memory holding a program which makes the processor function as an acquisition unit configured to acquire an adjustment value. The acquisition unit selects a mode from a plurality of modes and acquires the adjustment value in the selected mode, the plurality of modes including a first mode for acquiring the adjustment value based on the result of the focus detection which is based on the first signal and a second mode for acquiring the adjustment value by a method different from a method in the first mode based on the result of the focus detection based on the first signal and a result of the focus detection which is based on the second signal.

20 Claims, 4 Drawing Sheets

FIG. 4

| | DIFFERENCE BETWEEN S102 AND S104 | LENS SW | RELIABILITY OF SECOND FOCUS DETECTION (S104) | SELECTION OF ADJUSTMENT VALUE ACQUISITION MODE (S106) |
|---|---|---|---|---|
| SELECTION EXAMPLE 401 | SMALL | MF | ○ | MODE 1 |
| SELECTION EXAMPLE 402 | SMALL | MF | × | MODE 1 |
| SELECTION EXAMPLE 4021 | SMALL | AF | ○ | MODE 2 |
| SELECTION EXAMPLE 403 | SMALL | AF | × | MODE 2 |
| SELECTION EXAMPLE 403 | LARGE | MF | ○ | NG |
| | LARGE | MF | × | NG |
| SELECTION EXAMPLE 404 | LARGE | AF (+MF) | ○ | MODE 2 |
| SELECTION EXAMPLE 405 | LARGE | AF (+MF) | × | MODE 1 |

IMAGE PICKUP APPARATUS HAVING A FUNCTION FOR ADJUSTING A DETECTED IN-FOCUS POSITION AND CONTROL METHOD FOR IMAGE PICKUP APPARATUS

BACKGROUND OF THE INVENTION

Field of the Invention

The aspect of the embodiments relates to an image pickup apparatus, and more particularly, to an image pickup apparatus having a function for adjusting an in-focus position detected by focus detection, and a control method for the image pickup apparatus.

Description of the Related Art

In an image pickup apparatus, so-called focus adjustment for automatic focus adjustment has heretofore been known. Focus adjustment is a technique of detecting the individual differences of parts to be used due to tolerances in production or the like, storing, in advance, adjustment values for automatic focus adjustment according to the respective operation characteristics in a non-volatile memory at the time of shipping from a factory, and performing appropriate focus adjustment based on the adjustment values.

On the other hand, there are circumstances in which components are worn due to, for example, a long-period use, in a use environment of a user, and optical components are misaligned in a specific environment, for example, under high temperature or low temperature. In addition, in an image pickup apparatus to which an interchangeable lens unit is attached, an in-focus position may deviate from that at the time of shipping from a factory, depending on a combination of the lens unit and the image pickup apparatus.

In this regard, a technique for storing an adjustment value set by a user in a main body portion separately from adjustment values stored in a non-volatile memory at the time of shipping from a factory is known. According to this technique, an adjustment value (AF adjustment value) for focus adjustment can be set by a user.

For example, Japanese Patent Application Laid-Open No. 2011-232704 discusses a technique for calculating the AF adjustment value from a difference between a defocus amount detected using a dedicated AF sensor and a defocus amount detected using an image sensor that outputs a captured image signal. This method enables a user to set the AF adjustment value more easily than in the case of setting an arbitrary AF adjustment value.

However, in the focus detection using a pixel signal discussed in Japanese Patent Application Laid-Open No. 2011-232704, detection results may vary depending on the brightness or contrast of a subject, or no detection results may be obtained. Therefore, it is not always preferable to follow the focus detection result of the pixel signal in the calculation of the adjustment value.

Therefore, an image pickup apparatus of acquiring an adjustment value with a high accuracy even when results of focus detection using a pixel signal vary is sought.

SUMMARY OF THE INVENTION

According to an aspect of the embodiments, an image pickup apparatus includes a sensor including a photoelectric conversion unit configured to receive a plurality of light beams having passed through different pupil regions in an image-forming optical system, the sensor outputting a first signal having a parallax, an image sensor including a photoelectric conversion unit configured to receive a plurality of light beams having passed through different pupil regions in the image-forming optical system, the image sensor outputting an image pickup signal and a second signal having a parallax, at least one processor, and a memory holding a program which makes the processor function as a first focus detection unit configured to perform focus detection by a phase difference method based on the first signal, a second focus detection unit configured to perform focus detection by the phase difference method based on the second signal, an acquisition unit configured to acquire an adjustment value, and a control unit configured to control a focal position of the image-forming optical system based on the adjustment value and a result of the focus detection by the first focus detection unit. The acquisition unit selects an adjustment value acquisition mode to be used to acquire the adjustment value from a plurality of adjustment value acquisition modes and acquires the adjustment value in the selected adjustment value acquisition mode, the plurality of adjustment value acquisition modes including a first adjustment value acquisition mode for acquiring the adjustment value based on the result of the focus detection by the first focus detection unit and a second adjustment value acquisition mode for acquiring the adjustment value by a method different from a method in the first adjustment value acquisition mode based on the result of the focus detection by the first focus detection unit and a result of the focus detection by the second focus detection unit.

Further features of the disclosure will become apparent from the following description of exemplary embodiments with reference to the attached drawings.

BRIEF DESCRIPTION OF THE DRAWINGS

FIG. 4 is a table illustrating a list of parameters and appropriate adjustment modes to be used for determination of the adjustment mode according to the present exemplary embodiment.

DESCRIPTION OF THE EMBODIMENTS

Figure 1:
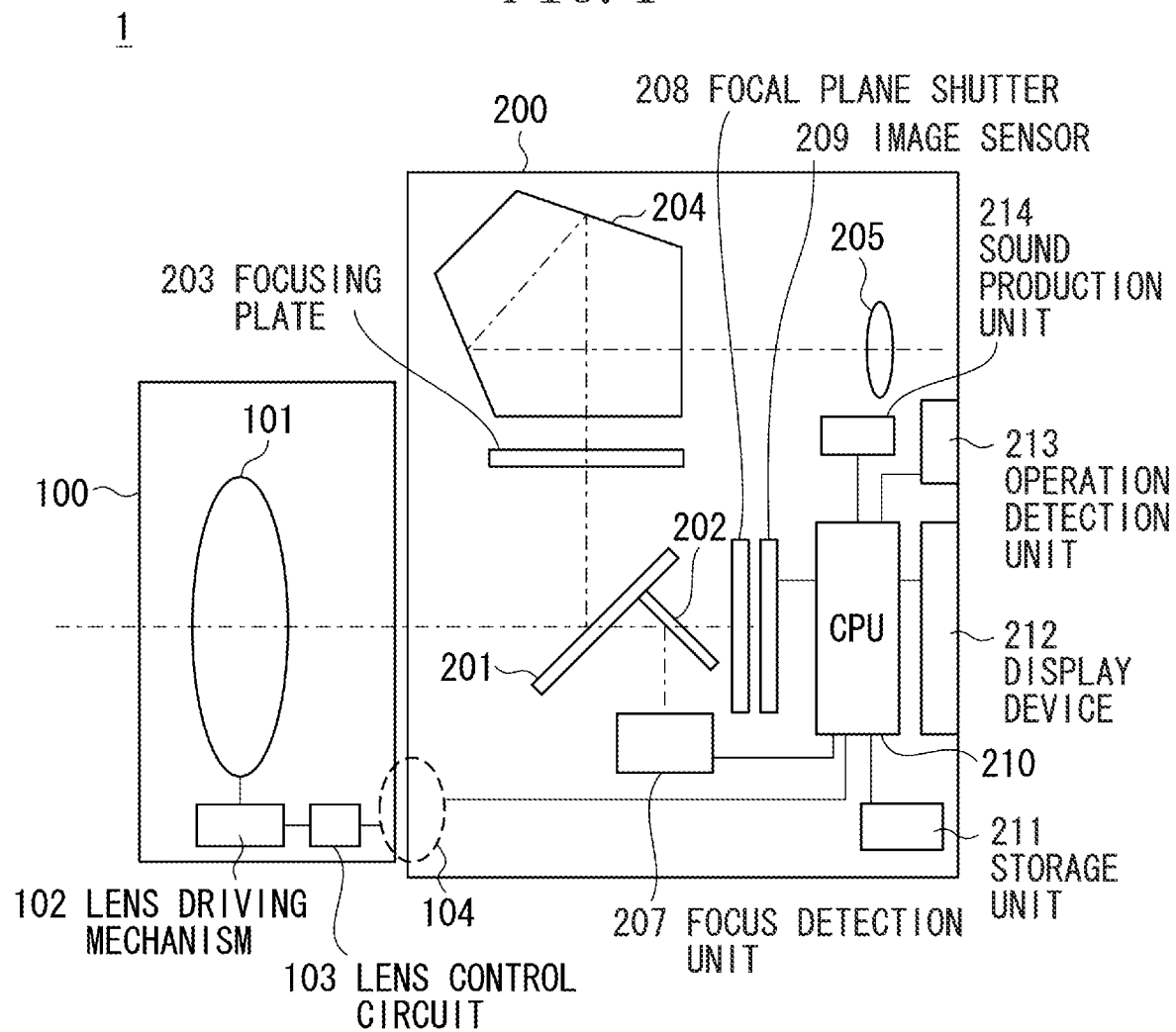
FIG. 1 is a schematic configuration diagram illustrating an image pickup apparatus according to an exemplary embodiment of the disclosure.

Exemplary embodiments of the disclosure will be described in detail with reference to the accompanying drawings. In the drawings, the same members are denoted by the same reference numerals, and redundant explanations are omitted. An image pickup apparatus according to an exemplary embodiment of the disclosure selects an adjustment value acquisition method depending on circumstances at the time of acquiring an autofocus (AF) adjustment value.

FIG. 1 is a schematic diagram illustrating an image pickup system 1 according to the present exemplary embodiment. As illustrated in FIG. 1, an imaging lens unit 100 is detachably attached to an image pickup apparatus 200 through a lens mounting mechanism of a mounting portion which is not illustrated. The mounting portion is provided with an electric contact unit 104. A desired imaging lens unit can be selected from among a plurality of imaging lens units and the selected imaging lens unit can be attached to the mounting portion. The image pickup apparatus 200 communicates with the imaging lens unit 100 through the electric contact unit 104 and controls a focus lens 101 which is included in the imaging lens unit 100.

The imaging lens unit 100 is provided with a lens switch (not illustrated) for selecting a manual focus (also referred to as "MF") or autofocus (also referred to "AF") as a driving system for the focus lens 101. The MF is a first control mode for controlling a focal position of an image-forming optical system according to a user operation. When the MF is selected by the lens switch, the focus lens 101 is driven and controlled in response to a user operation performed on an imaging lens. The AF is a second control mode for controlling the focal position of the image-forming optical system based on a result of detection of secondary imaging AF or imaging plane AF to be described below. When the AF is selected by the lens switch, the focus lens 101 is driven and controlled based on the result of detection of secondary imaging AF or imaging plane AF. Although FIG. 1 illustrates only the focus lens 101 as the image-forming optical system included in the imaging lens unit 100, other lenses such as a magnification lens and a fixed lens, in addition to the focus lens 101, may be included in the imaging lens unit 100.

A light beam from a subject is guided to a main mirror 201 in the image pickup apparatus 200 through the image-forming optical system of the imaging lens unit 100. The main mirror 201 is disposed obliquely with respect to an optical axis within an imaging optical path and is rotatable between a first state (a state illustrated in FIG. 1) in which the light beam from the subject is guided to a finder optical system disposed above the main mirror 201 and a second state in which the main mirror 201 is allowed to retract to the outside of the imaging optical path.

When the main mirror 201 is in the first state, the main mirror 201 reflects the light beam from the subject and guides the light beam to the finder optical system disposed above the main mirror 201. A central portion of the main mirror 201 is a half mirror portion. When the main mirror 201 is in the first state, a part of the light beam from the subject is transmitted through the half mirror portion. The light beam which has been transmitted through the half mirror portion is reflected by a sub-mirror 202, which is provided on the back side of the main mirror 201, and is guided to a focus detection unit 207.

The focus detection unit 207 is a unit that includes a dedicated optical system and a sensor including a photoelectric conversion unit and outputs a first focus detection signal to be used for focus detection by a phase difference method. The first focus detection signal is transmitted to a camera central processing unit (CPU) 210 to be described below. The focal position of the image-forming optical system included in the lens unit is detected by focus detection based on the first focus detection signal. The focus detection based on the focus detection signal generated using the dedicated optical system and the dedicated sensor is herein referred to as "secondary imaging AF" or "first focus detection". The secondary imaging AF may include adjustment of the focal position based on focus detection.

The light beam reflected by the main mirror 201 is focused on a focusing plate 203 which is disposed at a position optically conjugate to an image sensor 209. Light (subject image) which is diffused by the focusing plate 203 and transmitted through the focusing plate 203 is converted into an erected image by a penta dach prism 204. The erected image is enlarged by an eyepiece lens 205 and observed by a user.

When the main mirror 201 is in the second state, the sub-mirror 202 is folded with respect to the main mirror 201 and allowed to retract to the outside of the imaging optical path. The light beam from an imaging optical system passes through a focal plane shutter 208, which is a mechanical shutter, and reaches the image sensor 209. The focal plane shutter 208 limits the amount of light to be incident on the image sensor 209.

The image sensor 209 is an image sensor including a photoelectric conversion element such as a charge-coupled device (CCD) sensor or a complementary metal-oxide semiconductor (CMOS) sensor. The image sensor 209 photoelectrically converts a subject image formed by the imaging optical system to generate a focus detection signal and an image pickup signal.

Figure 2:
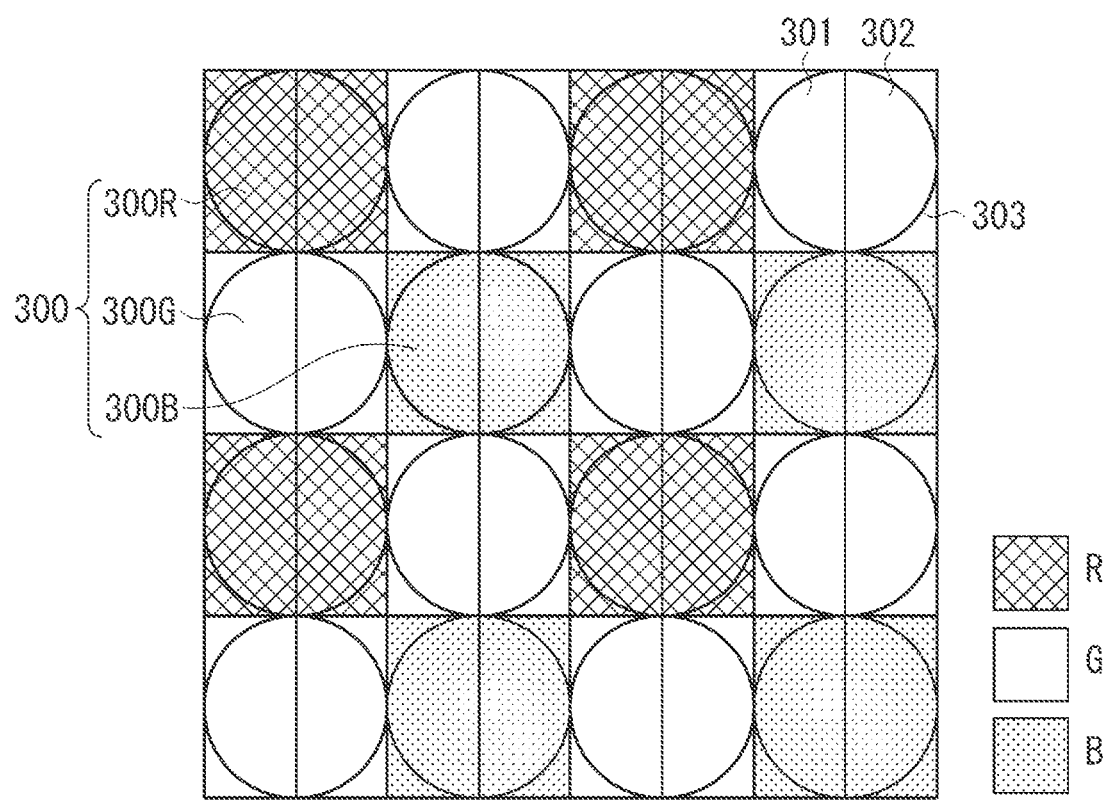
FIG. 2 is a schematic diagram illustrating an array of image pickup pixels and focus detection pixels of an image sensor according to the present exemplary embodiment.

FIG. 2 is a schematic diagram illustrating a pixel array in the image sensor 209 according to the present exemplary embodiment. FIG. 2 illustrates a pixel array of a two-dimensional CMOS sensor according to the present exemplary embodiment in a range of 4 columns×4 rows. In the image sensor 209 according to the present exemplary embodiment, pixels are arranged in a Bayer array. A pixel 300R having spectral sensitivity of R (red) is placed at an upper left position. Pixels 300G each having spectral sensitivity of G (green) are placed at an upper right position and a lower left position. A pixel 300B having spectral sensitivity of B (blue) is placed at a lower right position. The pixels 300R, 300G, and 300B each include a first photoelectric conversion unit 301 and a second photoelectric conversion unit 302 which share one microlens 303 and are arranged in a range of 2 columns×1 row. The first photoelectric conversion unit 301 and the second photoelectric conversion unit 302 receive light beams which have passed through different pupil regions in the image-forming optical system. Signals obtained by the first and second photoelectric conversion units can be separately output. Accordingly, a signal obtained by a plurality of first photoelectric conversion units (the signal may be hereinafter referred to as an "A image signal") and a signal obtained by a plurality of second photoelectric conversion units (the signal may be hereinafter referred to as a "B image signal") can be output from the image sensor 209. The A image signal and the B image signal have a parallax, and a second focus detection signal including a pair of the A image signal and the B image signal is transmitted to the camera CPU 210 to be described below. The camera CPU 210 detects the focal position of the image-forming optical system included in the lens unit through focus detection by the phase difference method based on the second focus detection signal.

The A image signal and the B image signal can be added together, or signals obtained by the first and second photoelectric conversion units can be output together (not separately). In this way, since each of the pixels 300R, 300G, and 300B can output a signal corresponding to a subject image formed by light passing through the entire exit pupil of the image-forming optical system, the image sensor 209 can also output the image pickup signal.

While the present exemplary embodiment illustrates an example of the image sensor in which the pupil region is divided into two regions in the horizontal direction, the pupil region may be divided, as needed, in the vertical direction. Alternatively, the pupil region may be divided in both the horizontal direction and the vertical direction and the photoelectric conversion units may be arranged in a range of a plurality of columns×a plurality of rows. A plurality of pixels each including the first photoelectric conversion unit and the second photoelectric conversion unit is arranged in the image sensor 209 according to the present exemplary embodiment, but the disclosure is not limited to this configuration. Each image pickup pixel that outputs the image pickup signal and each focus detection pixel that outputs the focus detection signal may be separately formed, and focus detection pixels for outputting an A image and focus detection pixels for outputting a B image may be arranged in a part of an image pickup pixel array.

The focus detection based on the focus detection signal output from the image sensor 209 which outputs the image pickup signal and the focus detection signal is herein referred to as "imaging plane AF" or "second focus detection". The imaging plane AF may include adjustment of the focal position based on focus detection.

In both the secondary imaging AF and the imaging plane AF, in a case where the AF is selected by the lens switch provided in the imaging lens unit 100, the focus detection is executed according to a user operation for instructing execution of the AF, and the focus lens 101 is driven into an in-focus state. The term "in-focus state" used herein refers to a state in which a defocus amount falls within a predetermined range as a result of focus detection after the focus lens is driven. A range of defocus which is determined to be the in-focus state is herein referred to as an in-focus determination width. The in-focus determination width is determined based on the balance between a time required for obtaining the in-focus state and a focusing accuracy of obtained images by taking into consideration the effects of a mechanical error, such as backlash of the focus lens 101, and variations in results of focus detection.

In both the secondary imaging AF and the imaging plane AF during focus detection, an evaluation value (hereinafter simply referred to as "reliability") to be used for evaluating the reliability of the AF is acquired and calculated. The reliability indicates a value acquired as parameters for the strength of the focus detection signal, the contrast, the coincidence of signal waveforms of a pair of signals constituting the focus detection signal, and the like. If there is a possibility that a ranging accuracy decreases, for example, when the subject is dark, or the contrast of the subject is low, the value of the reliability is small. Although the reliability can be acquired from a plurality of parameters as described above, a plurality of reliability evaluation values may be obtained, or only one reliability evaluation value may be obtained. In a case where a plurality of reliability evaluation values is to be obtained, the reliability may be determined based on whether all the evaluation values satisfy a predetermined threshold, or may be determined based on a certain specific evaluation value.

The camera CPU 210 includes a microprocessor or the like and controls the overall performance of the image pickup apparatus 200 such as various calculations and various operations in the image pickup apparatus 200. The camera CPU 210 communicates with a lens control circuit 103 in the imaging lens unit 100 through the electric contact unit 104. The lens control circuit 103 controls a lens driving mechanism 102 according to a signal supplied from the camera CPU 210, thereby driving the focus lens 101 in the optical axis direction to perform focus adjustment. In this manner, the camera CPU 210 controls the focal position of the image-forming optical system through the electric contact unit 104, the lens control circuit 103, and the lens driving mechanism 102.

The lens driving mechanism 102 includes a motor as a drive source and drives lenses such as the focus lens 101. The type of the motor varies depending on the type of the imaging lens unit. For example, a stepping motor or an ultrasonic motor is used.

The camera CPU 210 is connected to each of a storage unit 211, a display device 212, an operation detection unit 213, and a sound production unit 214.

The storage unit 211 stores parameters that are to be adjusted for control of the image pickup apparatus 200, camera identification (camera ID) information which is unique information for identifying the image pickup apparatus 200, adjustment values for parameters associated with image capturing that are adjusted using a reference lens during production, and the like. The storage unit 211 includes, for example, a non-volatile memory element such as an electrically erasable programmable read-only memory (EEPROM).

The display device 212 is a device for displaying a subject image based on the image pickup signal output from the image sensor 209 and displaying items to be set by the user. The display device 212 functions as a display unit in the image pickup apparatus 200. The display device 212 includes, for example, a liquid crystal display element or an organic electroluminescence (EL) element for color display.

The operation detection unit 213 transmits, to the camera CPU 210, a signal based on a user operation through an operation member (not illustrated). As the operation member, various selection buttons, a dial, a release button configured to sequentially turn on a first switch (SW1) and a second switch (SW2) according to the amount of pressing to instruct a shooting operation, a touch panel associated with the display device 212, and the like are used.

The sound production unit 214 produces sound according to an instruction from the camera CPU 210.

The lens control circuit 103 of the imaging lens unit 100 is provided with a memory (not illustrated) for storing various information. This memory stores performance information, such as a focal length and a maximum aperture value of the imaging lens unit 100, lens identification (lens ID) information which is unique information for identifying the imaging lens unit 100, information received from the camera CPU 210 by communication, and the like. The performance information and the lens ID information are transmitted to the camera CPU 210 by initial communication when the imaging lens unit 100 is attached to the image pickup apparatus 200. The camera CPU 210 causes the storage unit 211 to store the pieces of received information.

The image pickup apparatus 200 according to the present exemplary embodiment has a function (referred to as AF micro-adjustment) for adjusting the in-focus position based on the result of focus detection performed by the focus detection unit 207 by using the adjustment amount and adjusting the focus lens to be driven into the adjusted in-focus position. The adjustment value set in the present exemplary embodiment is acquired and set by adjustment value acquisition processing to be started based on a user operation. In the adjustment value acquisition processing, the camera CPU 210 calculates the adjustment value based on the current state and the focus detection results of the secondary imaging AF and the imaging plane AF. The image pickup apparatus 200 is acquiring the adjustment value in a plurality of adjustment value acquisition modes to be described below, and selects an adjustment value acquisition mode to be applied and then acquires the adjustment value by using the selected adjustment value acquisition mode.

The adjustment value acquisition modes according to the present exemplary embodiment will be described. The present exemplary embodiment illustrates an example of the image pickup apparatus 200 including two adjustment value acquisition modes, i.e., a first adjustment value acquisition mode and a second adjustment value acquisition mode. The adjustment value may be an adjustment value (unit: Fδ) for a focal depth, or may be an adjustment value (unit: μm) for a focal position.

The first adjustment value acquisition mode is a mode for acquiring the adjustment value based on the focus detection result of the first focus detection and acquiring the adjustment value in such a manner that the defocus amount obtained by the first focus detection decreases (the absolute value of the defocus amount decreases). More specifically, the first adjustment value acquisition mode is a mode for acquiring the adjustment value based on a difference between the current focal position and the in-focus position obtained by the first focus detection, assuming that the current focal position is an accurate in-focus position (i.e., a position where the defocus amount=0). The first adjustment value acquisition mode is more likely to be selected in a case where the final position of the focus lens 101 is adjusted by the user, for example, when the in-focus state is obtained in an MF mode, or when the in-focus state is obtained in a full-time manual focus mode for driving a lens after the AF.

The second adjustment value acquisition mode is a mode for acquiring the adjustment value based on the focus detection result of the first focus detection and the focus detection result of the second focus detection. Unlike in the first adjustment value acquisition mode, the adjustment value is acquired so that the difference between the defocus amount obtained by the first focus detection and the defocus amount obtained by the second focus detection decreases. More specifically, the second adjustment value acquisition mode is a mode for acquiring the adjustment value based on the difference between the focus detection result of the first focus detection and the focus detection result of the second focus detection. The second adjustment value acquisition mode is more likely to be selected when the final position of the focus lens 101 is adjusted based on the second focus detection result, or when a defocus amount that can be detected by the second focus detection still remains even after the position of the focus lens 101 is adjusted by the user. This is because the use of the second adjustment value acquisition mode enables acquisition of the adjustment value used to also adjust the remaining defocus amount in such cases. A detailed method for selecting the modes will be described below.

Figure 3:
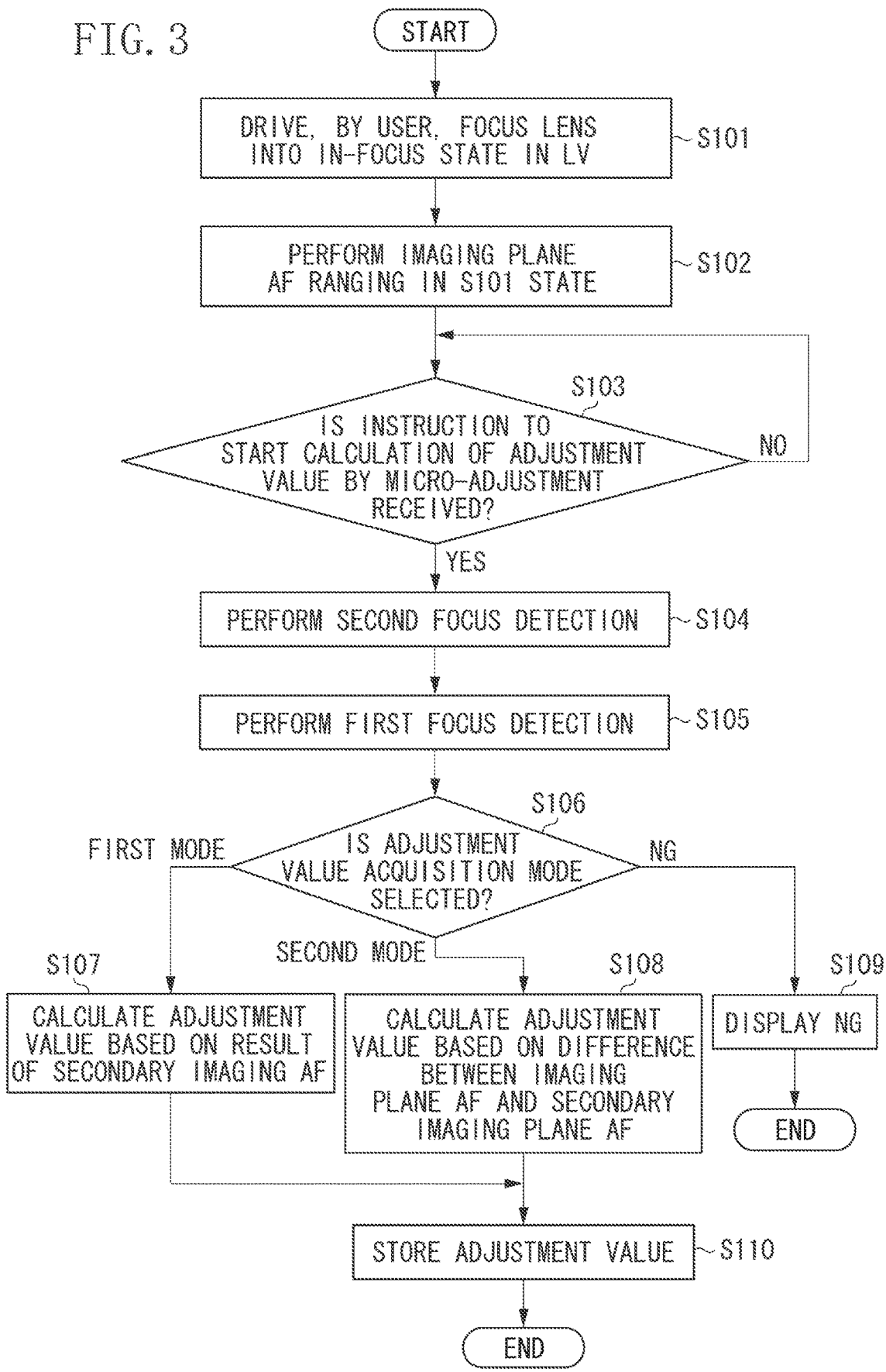
FIG. 3 is a flowchart illustrating an operation for calculating an autofocus (AF) adjustment value in an AF microadjustment according to the present exemplary embodiment.

FIG. 3 is a flowchart illustrating an operation for acquiring the AF adjustment value in the AF micro-adjustment according to the present exemplary embodiment. The AF micro-adjustment is started when the user performs a predetermined operation. For example, the AF micro-adjustment may be started, for example, when a mode for performing the AF micro-adjustment is set from a camera menu, when a specific operation button is pressed, or when a combination of specific operation buttons is continuously pressed for a certain period of time or longer. If a live view (LV) mode for checking a captured image on the display device 212 is set, a standby state may be set so that calculation of the adjustment value in step S103 to be described below can be started any time.

When the AF micro-adjustment is started, in step S101, the user drives the focus lens 101 into the in-focus state. This lens operation may be performed in such a manner that the user adjusts the position of the focus lens 101 by, for example, driving a focus ring, or the user instructs the autofocus adjustment (AF) by a camera. The AF used in this case is an image plane phase difference AF based on the second focus detection result, but instead so-called contrast AF using the contrast of the image pickup signal output from the image sensor may be used. However, the use of the imaging plane phase difference AF enables acquisition of the adjustment value with a high accuracy in the second adjustment value acquisition mode. In the case of adjusting the position of the focus lens 101 by the MF, the user may adjust the focal position while observing the focal position through a finder. The focal position is adjusted while checking a light-receiving image of the image sensor 209 displayed on the display device 212. After the user drives the lens into the in-focus state, the processing proceeds to step S102.

In step S102, the focal position is adjusted. In the in-focus state, the second focus detection is performed and the focus detection result is stored in the storage unit 211. In step S102, the control of the focus lens 101 based on the focus detection result is not performed but only the detection of the focus state of the subject is performed. The second focus detection may also be performed in step S101. For example, when the user drives the focus lens 101 into the in-focus state by the MF, the camera periodically performs the second focus detection while the user is adjusting the position of the focus lens 101, and the focus detection result stored in the storage unit 211 is updated. After an adjustment value calculation start instruction to be described below is received, the stored focus detection result (last updated value) is used as the focus detection result in step S102. In this case, however, a light beam is guided to the imaging plane by setting mirror lock-up so as to acquire a second focus signal for the second focus detection. Accordingly, in the case of performing the second focus detection and the MF in parallel, the focal position is adjusted while the user is checking the light-receiving image of the image sensor 209 on the display device 212 (i.e., in an LV state). When the user instructs the camera to perform the AF to drive the focus lens 101 into the in-focus state, the second focus detection may be performed after the focal position is adjusted by the AF. Therefore, when the second focus detection is already performed after the focal position adjustment in step S101, for example, when the focal position is not adjusted (i.e., the focus lens is originally in the in-focus state) in step S101, step S102 may be omitted. When the in-focus state made by the AF in the full-time manual focus mode is adjusted, the adjustment of the focal position is performed between step S102 and subsequent step S103. In one embodiment, step S102 is performed immediately after the focal position adjustment by the AF. After completion of storage of the focus detection ranging result, the processing proceeds to step S103.

In step S103, the camera CPU 210 determines whether an acquisition start instruction to start acquisition of the AF adjustment value by micro-adjustment is received. If the acquisition start instruction to start acquisition of the adjustment value is received (YES in step S103), the processing proceeds to step S104. If the acquisition start instruction to start acquisition of the adjustment value is not received (NO in step S103), the processing returns to step S103 to wait until the acquisition start instruction to start acquisition of the adjustment value is received. The adjustment value acquisition start instruction may be input by a predetermined user operation, or may be generated and input by the camera itself when a predetermined condition is satisfied. For example, in the MF mode, the camera CPU 210 may generate the adjustment value acquisition start instruction after a lapse of a predetermined time during which the position of the lens is not changed, or after a lapse of a predetermined time subsequent to completion of control of the lens position by the AF.

In step S104, the camera CPU 210 performs the second focus detection again and stores the detection result in the storage unit 211. Also, in this case, like in step S102, the control of the focus lens 101 based on the focus detection result is not performed and only the detection of the focus state of the subject is performed. The focus detection result in step S104 is used for determination as to whether full-time manual focus driving is performed in step S106 to be described below. Step S104 may be omitted when a lens unit that is non-compliant with the full-time manual focus is attached, or when it is obvious that the lens position is adjusted by the MF in step S101. However, since the second focus detection result is used in the second adjustment value acquisition mode, in one embodiment, the second focus detection is performed at a timing closer to the timing of adjustment value acquisition processing (steps S107 and 108) to be described below, and the second focus detection is performed again after step S103. After completion of storage of the focus detection result, the processing proceeds to step S105.

In step S105, the camera CPU 210 causes the main mirror 201 and the sub-mirror 202 to descend into the optical path of the sub-mirror 202 to guide light to the focus detection unit 207 and perform the first focus detection. The focus detection result is stored in the storage unit 211. Also, in this case, the control of the focus lens 101 based on the focus detection result is not performed and only the detection of the focus state of the subject is performed. After completion of storage of the focus detection result, the processing proceeds to step S106.

In step S106, the camera CPU 210 selects the adjustment value acquisition mode to be used to acquire the AF adjustment value. Since the image pickup apparatus 200 according to the present exemplary embodiment includes the first adjustment value acquisition mode and the second adjustment value acquisition mode as the adjustment value acquisition modes as described above, the image pickup apparatus 200 selects either one of the adjustment value acquisition modes as the mode to be used. Although selection reference examples are described below, for example, a result of estimation as to whether the detection of the focal position in step S104 is performed under control of the user or under control of the AF function of the camera is used as a selection reference. If the first adjustment value acquisition mode is selected ("FIRST MODE" in step S106), the processing proceeds to step S107. If the second adjustment value acquisition mode is selected ("SECOND MODE" in step S106), the processing proceeds to step S108. If it is determined that the state is not appropriate for calculation of the adjustment value ("NG" in step S106), the processing proceeds to step S109.

In step S107, the camera CPU 210 acquires the AF adjustment value in the first adjustment value acquisition mode. Specifically, the adjustment value is acquired based on the result of the first focus detection performed in step S105 that is stored in the storage unit 211. More specifically, the adjustment value is calculated in such a manner that the value offsets a defocus amount to "0" for the first focus detection result. For example, when the focus detection result acquired in step S105 indicates that the defocus amount is $\alpha F\delta$, the adjustment value is $-\alpha F\delta$. After completion of acquisition of the adjustment value, the processing proceeds to step S110.

In step S108, the camera CPU 210 acquires the AF adjustment value in the second adjustment value acquisition mode. Specifically, the adjustment value is acquired based on the result of the second focus detection performed in step S104 and the result of the first focus detection performed in step S105. The focus detection results are stored in the storage unit 211. If step S104 is omitted, the focus detection result obtained in step S102 is used. Specifically, the adjustment value is calculated in such a manner that the value offsets the defocus amount based on the first focus detection result so that the defocus amount based on the first focus detection result matches the defocus amount based on the second focus detection result. For example, when the focus detection result obtained in step S105 indicates that the defocus amount is $\alpha F\delta$ and the focus detection result obtained in step S104 indicates that the defocus amount is $\beta F\delta$, the adjustment value is calculated to be $(-\alpha+\beta)F\delta$. After completion of acquisition of the adjustment value, the processing proceeds to step S110.

In step S109, information indicating that the state is not appropriate for acquisition of the adjustment value is displayed on the display device 212 or the like. After completion of display, the operation is terminated without performing the acquisition of the adjustment value.

In step S110, the adjustment value obtained in step S107 or S108 is stored in the storage unit 211. This adjustment value is used for adjustment of the first focus detection result when image pickup using the secondary imaging AF is performed.

Thus, the operation for acquiring the AF adjustment value in the AF micro-adjustment is completed.

The mode selection in step S106 will be described in detail with reference to FIG. 4. FIG. 4 is an example of a table illustrating a list of parameters used for selecting the adjustment mode and the adjustment value acquisition modes to be selected according to the present exemplary embodiment. In the present exemplary embodiment, the difference between the focus detection result obtained in step S102 and the focus detection result obtained in step S104, the state of the lens switch, and the reliability of the focus detection result obtained in step S104 are used as parameters to select the adjustment value acquisition mode. The parameters will be described.

A leftmost row in FIG. 4 indicates that the difference between the focus detection result obtained in step S102 and the focus detection result obtained in step S104 is "large" when the difference is equal to or larger than a threshold, and that the difference is "small" when the difference is less than the threshold. A second row from the left end in FIG. 4 indicates whether the MF is selected by the lens switch, or the AF is selected by the lens switch. A second row from the right end in FIG. 4 indicates the reliability of the focus detection result obtained in step S104 and indicates "○" when the reliability of the AF obtained as described above is equal to or higher than a threshold and "×" when the reliability is lower than the threshold. The parameters used for selecting the adjustment value acquisition mode are not limited to these examples. For example, a displacement between coordinates of an AF region to which the adjustment value is applied and coordinates of an AF region used for calculating the adjustment value may also be used. A method for switching the mode between the first adjustment value acquisition mode and the second adjustment value acquisition mode as described below is also not limited to the selection example illustrated in FIG. 4, and various modifications and alterations can be made within the scope of the aspect of the embodiments.

In the selection example illustrated in FIG. 4, based on the difference between the focus detection results obtained in steps S102 and S104 and the state of the lens switch, it is estimated whether the focal position at the point of step S105 is controlled according to a user operation, or the focal position is controlled based on the focus detection result of the second focus detection. If it is estimated that the focal position is controlled according to the user operation (first control mode) based on the estimation result, the first adjustment value acquisition mode is selected. If it is estimated that the focal position is controlled based on the detection result of the second focus detection (second control mode), the second adjustment value acquisition mode is selected.

First, selection examples 401 and 402 will be described. In these selection examples, the camera CPU 210, which functions as a selection unit, estimates the focal position control mode depending on the state of the lens switch, and switches the adjustment value acquisition mode. When the MF is selected by the lens switch (selection example 401), it is considered that the focal position is controlled in the first control mode and the focus lens 101 is driven according to the user operation to a position where it is determined that there is no defocus. In this case, it is determined that the current state is a no-defocus state intended by the user, regardless of the second focus detection result, and the first adjustment value acquisition mode (mode 1) in which the ranging result (ranging result of step S105) of the secondary imaging plane AF is zero is selected. On the other hand, when the AF is selected by the lens switch (selection example 402), the difference between the focus detection results obtain in steps S102 and S104 is small and thus it is less likely that the user has performed the focus adjustment between step S102 and step S104. In other words, it is less likely that the full-time manual focus has been performed. Therefore, it is considered that the focus lens 101 is controlled and driven by the camera by means of the imaging plane AF or the secondary imaging AF and is stopped within the in-focus determination width. In this case, the focus state includes an amount of defocus in a range equal to or less than the in-focus determination width. Accordingly, the second adjustment value acquisition mode (mode 2) is selected for also adjusting the defocus amount in the in-focus determination width. The second adjustment value acquisition mode is a mode for acquiring and setting the adjustment value in such a manner that the difference between the second focus detection result (focus detection result obtained in step S104), which is the detection result of the current focus state, and the first focus detection result of the adjustment target (focus detection result obtained in step S105) decreases.

Next, a selection example 405 will be described by comparing the selection example 405 with a selection example 4021. The selection example 405 differs from the selection example 4021 in that the difference between the second focus detection result obtained in step S104 at the adjustment value acquisition timing and the second focus detection result obtained in step S102 immediately before the adjustment value acquisition timing is equal to or larger than a defocus threshold. If the difference between the detection result obtained in step S104 and the detection result obtained in step S102 is equal to or larger than the defocus threshold (selection example 405), it is considered that variations in the second focus detection result are large, or that the full-time manual focus has been performed. In this case, it is determined that the current state is a no-defocus state intended by the user, regardless of the second focus detection result, and the first adjustment value acquisition mode is selected. On the other hand, if the difference between the detection result obtained in step S104 and the detection result obtained in step S102 is less than the defocus threshold (selection example 4021), it is considered that variations in the second focus detection result are small and the full-time manual focus has not been performed. Accordingly, as described above, the second adjustment value acquisition mode is selected to also adjust the defocus amount within the in-focus range.

Next, a selection example 404 will be described by comparing the selection example 404 with the selection example 405. The selection example 404 differs from the selection example 405 in that the reliability of the second focus detection in step S104 is high. When the reliability of the focus detection in step S104 is equal to or higher than a threshold, it is considered that variations in the second focus detection result are small and the reliability is high. If the reliability of the focus detection in step S104 is high and the difference between the focus detection results obtained in steps S102 and S104 is large, such a case can be considered that the full-time manual focus has been performed, as well as a case that the user has unintentionally moved the focal position, or a case that the subject has been moved. However, in these cases, even when the full-time manual focus has been performed, it is determined that the second focus detection result obtained in step S104 is more reliable than the adjustment result obtained by the full-time manual focus, and thus the second adjustment value acquisition mode is selected. When it is estimated that the full-time manual focus has been performed in this manner and the reliability of the focus detection result obtained in step S104 is high, the adjustment value acquisition mode to be used depending on the defocus amount obtained as a result of the focus detection in step S104 may be selected. For example, when the defocus amount obtained in step S104 is equal to or less than a threshold, the first adjustment value acquisition mode may be selected according to a user's intention, and when the defocus amount is equal to or more than the threshold, the second adjustment value acquisition mode may be selected on the assumption that the user has unintentionally moved the focal position or the subject has moved.

A selection example 403 will be described. This example illustrates a case where the difference between the focus detection results obtained in steps S102 and S104 is large and the lens switch is in the MF state. Possible causes for this state are, for example, that the subject has moved between steps S102 and S104, that the user has unintentionally moved the focal position, and that it is difficult to perform appropriate focus detection due to large variations in the second focus detection result. In this state, there is a possibility that an inappropriate adjustment value may be acquired, and thus it is determined that it is not appropriate for acquiring the adjustment value and the acquisition of the adjustment value is stopped.

As described above, the image pickup apparatus according to the present exemplary embodiment includes the mode for acquiring the adjustment value using the focal position during the acquisition of the adjustment value as a reference position and the mode for acquiring the adjustment value together with the result of detection using the imaging plane AF, as the modes for acquiring the adjustment value of the secondary imaging AF. Further, the mode to be used for acquiring the adjustment value is selected and switched by a predetermined method, thereby enabling acquisition of the adjustment value with a high accuracy depending on the circumstances during the acquisition of the adjustment value. In an example of switching the mode, the mode is switched depending on which one of the MF and AF is selected by the lens switch. In this way, even when the user himself/herself adjusts the lens position to bring the lens into a state in which there is no defocus, as well as when the lens is driven by the AF operation and a defocus amount within the in-focus determination width still remains, the adjustment value acquisition mode suitable for each case can be used. In another example of switching the mode, the mode is switched depending on the difference between the focus detection result during the camera AF operation (S102) and the focus detection result during the adjustment value acquisition (S104). Consequently, even when variations in the detection result of the imaging plane AF are large, as well as when the focal position is controlled according to a user operation after the in-focus state is obtained by the AF, the adjustment value acquisition mode suitable for each case can be used. In still another example of switching the mode, the mode is switched based on the reliability of the focus detection result of the imaging plane AF. Accordingly, the amount of defocus that can be detected by the imaging plane AF is also adjusted when the focus detection result of the imaging plane AF is stable, and the current focal position is set as the reference position when the detection result varies, thereby enabling the adjustment with a higher accuracy.

According to the exemplary embodiments described above, in the first adjustment value acquisition mode, a value for offsetting the defocus amount based on the first focus detection is set as the adjustment value, and in the second adjustment value acquisition mode, a value obtained by subtracting the defocus amount based on the first focus detection from the defocus amount based on the second focus detection is set as the adjustment value. However, as a modified example, values obtained by converting the values acquired as described above may be used as the adjustment value. For example, a configuration is known in which, with an AF micro-adjustment function, the user inputs a scale value set at a predetermined interval and sets the adjustment value based on the input scale value. The adjustment value acquired in the first or second adjustment value acquisition mode of the exemplary embodiments described above is converted into a scale value and the scale value is stored, thereby enabling the user to easily recognize the degree of the set adjustment value. The adjustment value acquired in the first or second adjustment value acquisition mode may be finely adjusted by the user. The method for converting the adjustment value into the scale value is not particularly limited. For example, the conversion may be performed by selecting a scale value corresponding to a value that is closest to the acquired adjustment value.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-126236, filed Jun. 28, 2017, which is hereby incorporated by reference herein in its entirety.

What is claimed is:

1. An apparatus comprising:
a sensor including a photoelectric conversion unit configured to receive a plurality of light beams having passed through different pupil regions in an image-forming optical system, the sensor outputting a first signal having a parallax;
an image sensor including a photoelectric conversion unit configured to receive a plurality of light beams having passed through different pupil regions in the image-forming optical system, the image sensor outputting an image pickup signal and a second signal having a parallax;
at least one processor; and
a memory holding a program which makes the processor function as:
a first focus detection unit configured to perform first focus detection by a phase difference method based on the first signal;
a second focus detection unit configured to perform second focus detection by the phase difference method based on the second signal;
an acquisition unit configured to acquire an adjustment value; and
a control unit configured to control a focal position of the image-forming optical system based on the adjustment value and a result of the first focus detection,
wherein the acquisition unit selects an adjustment value acquisition mode to be used to acquire the adjustment value from a plurality of adjustment value acquisition modes and acquires the adjustment value in the selected adjustment value acquisition mode, the plurality of adjustment value acquisition modes including a first adjustment value acquisition mode for acquiring the adjustment value based on the result of the first focus detection and a second adjustment value acquisition mode for acquiring the adjustment value by a method different from a method in the first adjustment value acquisition mode based on the result of the first focus detection and a result of the second focus detection.

2. The apparatus according to claim 1,
wherein the result of the first focus detection includes information about a defocus amount of the image-forming optical system, and
wherein, in the first adjustment value acquisition mode, the acquisition unit sets an adjustment value through an adjustment based on the adjustment value to be performed by the control unit such that an absolute value of the defocus amount to be obtained from the result of the first focus detection decreases.

3. The apparatus according to claim 2,
wherein the result of the second focus detection includes information about the defocus amount of the image-forming optical system, and
wherein, in the second adjustment value acquisition mode, the acquisition unit sets the adjustment value through an adjustment based on the adjustment value to be performed by the control unit such that an absolute value of a difference between the defocus amount to be obtained from the result of the first focus detection and the defocus amount to be obtained from the result of the second focus detection decreases.

4. The apparatus according to claim 1,
wherein each of the result of the first focus detection and the result of the second focus detection includes information about a defocus amount of the image-forming optical system, and
wherein, in the second adjustment value acquisition mode, the acquisition unit sets the adjustment value through an adjustment based on the adjustment value to be performed by the control unit such that an absolute value of a difference between the defocus amount to be obtained from the result of the first focus detection and the defocus amount to be obtained from the result of the second focus detection decreases.

5. The apparatus according to claim 1, wherein the acquisition unit estimates which one of a first control mode for controlling the focal position of the image-forming optical system according to a user operation and a second control mode for controlling the focal position of the image-forming optical system according to a result of the second focus detection is being used to control the focal position of the image-forming optical system, and selects the adjustment value acquisition mode to be used to acquire the adjustment value based on a result of the estimation.

6. The apparatus according to claim 5,
wherein, in a case where the acquisition unit estimates that the focal position is controlled in the first control mode, the acquisition unit selects the first adjustment value acquisition mode, and
wherein, in a case where the acquisition unit estimates that the focal position is controlled in the second control mode, the acquisition unit selects the second adjustment value acquisition mode.

7. The apparatus according to claim 5, further comprising a communication unit configured to receive information about a state of a switching member configured to switch a control mode between the first control mode and the second control mode, the communication unit being included in a lens unit including the image-forming optical system,
wherein the acquisition unit estimates a control mode for controlling the focal position based on the information about the state of the switching member.

8. The apparatus according to claim 7, wherein in a case where a lens unit controls the focal position according to a user operation, the acquisition unit selects the adjustment value acquisition mode to be used to acquire the adjustment value based on the information about the state of the switching member and a difference between a result of the second focus detection before receiving an acquisition start instruction to start acquisition of the adjustment value and a result of second focus detection after receiving the acquisition start instruction.

9. The apparatus according to claim 1,
wherein the acquisition unit receives an acquisition start instruction to start acquisition of the adjustment value and acquires the adjustment value,
wherein the second focus detection unit performs focus detection before receiving the acquisition start instruction and after receiving the acquisition start instruction, and
wherein the acquisition unit selects the adjustment value acquisition mode to be used to acquire the adjustment value based on a difference between a result of the focus detection performed before receiving the acquisition start instruction and a result of the focus detection performed after receiving the acquisition start instruction.

10. The apparatus according to claim 1,
wherein the second focus detection unit acquires a reliability of the second focus detection by the phase difference method based on the second signal, and
wherein the acquisition unit selects the adjustment value acquisition mode to be used to acquire the adjustment value based on the acquired reliability.

11. The apparatus according to claim 10, wherein in a case where the acquisition unit estimates that the focal position is controlled in the second control mode and determines that a difference between a result of the second focus detection before receiving an acquisition start instruction to start acquisition of the adjustment value and a result of the second focus detection after receiving the acquisition start instruction is equal to or larger than a threshold, the acquisition unit selects the adjustment value acquisition mode used to acquire the adjustment value based on the reliability.

12. The apparatus according to claim 1, further comprising an input unit configured to input the adjustment value as a scale value set at a predetermined interval,
wherein the acquisition unit converts the acquired adjustment value into the scale value.

13. An apparatus comprising:
a sensor including a photoelectric conversion unit configured to receive a plurality of light beams having passed through different pupil regions in an image-forming optical system, the sensor outputting a first signal having a parallax;
an image sensor including a photoelectric conversion unit configured to receive a plurality of light beams having passed through different pupil regions in the image-forming optical system, the image sensor outputting an image pickup signal and a second signal having a parallax;
at least one processor; and
a memory holding a program which makes the processor function as:
a first focus detection unit configured to perform first focus detection by a phase difference method based on the first signal;
a second focus detection unit configured to perform second focus detection by the phase difference method based on the second signal;
an acquisition unit configured to acquire an adjustment value; and
a control unit configured to control a focal position of the image-forming optical system based on the adjustment value and a result of the first focus detection,
wherein the acquisition unit includes a plurality of adjustment value acquisition modes including:
a first adjustment value acquisition mode for acquiring the adjustment value based on the result of the first focus detection and a first reference position, the first reference position being a focal position when an acquisition start instruction to start acquisition of the adjustment value is received; and a second adjustment value acquisition mode for acquiring the adjustment value by a method different from a method in the first adjustment value acquisition mode based on the result of the first focus detection and a result of the second focus detection.

14. The apparatus according to claim 13, wherein, in the second adjustment value acquisition mode, the acquisition unit acquires the adjustment value based on the result of the first focus detection and a second reference position corresponding to a focal position where the defocus amount is zero as a result of the second focus detection.

15. A method for an apparatus, the method comprising:
performing a first focus detection to perform focus detection by a phase difference method based on a first signal having a parallax;
performing a second focus detection to perform focus detection by the phase difference method based on a second signal having a parallax, the second signal being acquired by an image sensor for acquiring an image pickup signal;
selecting an adjustment value acquisition mode to be used to acquire an adjustment value from a plurality of adjustment value acquisition modes including a first adjustment value acquisition mode for acquiring the adjustment value based on a result of the first focus detection and a second adjustment value acquisition mode for acquiring the adjustment value by a method different from a method in the first adjustment value acquisition mode based on the result of the first focus detection and a result of the second focus detection;
acquiring the adjustment value in the selected adjustment value acquisition mode; and
controlling a focal position of an image-forming optical system based on the adjustment value and the result of the first focus detection.

16. The method according to claim 15,
wherein, in the performing the first focus detection, information about a defocus amount of the image-forming optical system is acquired, and
wherein, in a case where the first adjustment value acquisition mode is selected, in the acquiring the adjustment value, the adjustment value is set through an adjustment based on the adjustment value to be performed in the controlling such that an absolute value of the defocus amount acquired in the first focus detection decreases.

17. The method according to claim 16,
wherein information about a defocus amount of the image-forming optical system is acquired in the second focus detection, and
wherein, in a case where the second adjustment value acquisition mode is selected, in the acquiring the adjustment value, the adjustment value is set through an adjustment based on the adjustment value to be performed in the controlling such that an absolute value of a difference between the defocus amount acquired in the first focus detection and the defocus amount acquired in the second focus detection decreases.

18. The method according to claim 15,
wherein information about a defocus amount of the image-forming optical system is acquired in each of the first focus detection and the second focus detection, and
wherein, in a case where the second adjustment value acquisition mode is selected, in the acquiring the adjustment value, the adjustment value is set through an adjustment based on the adjustment value to be performed in the controlling such that an absolute value of a difference between the defocus amount acquired in the first focus detection and the defocus amount acquired in the second focus detection decreases.

19. The method according to claim 15, wherein the acquiring estimates which one of a first control mode for controlling the focal position of the image-forming optical system according to a user operation and a second control mode for controlling the focal position of the image-forming optical system according to a result of the second focus detection is being used to control the focal position of the image-forming optical system, and selects the adjustment value acquisition mode to be used to acquire the adjustment value based on a result of the estimation.

20. The method according to claim 19,
wherein, in a case where the acquiring estimates that the focal position is controlled in the first control mode, the acquiring selects the first adjustment value acquisition mode, and
wherein, in a case where the acquiring estimates that the focal position is controlled in the second control mode, the acquiring selects the second adjustment value acquisition mode.

* * * * *